(12) United States Patent
Beuterbaugh et al.

(10) Patent No.: US 11,466,200 B2
(45) Date of Patent: Oct. 11, 2022

(54) MULTI-FUNCTIONAL DIVERTER PARTICULATES

(71) Applicant: Halliburton Energy Services, Inc., Houston, TX (US)

(72) Inventors: Aaron Michael Beuterbaugh, Spring, TX (US); Larry Steven Eoff, Porter, TX (US); Travis Hope Larsen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/084,439

(22) PCT Filed: Sep. 12, 2018

(86) PCT No.: PCT/US2018/050672
§ 371 (c)(1),
(2) Date: Oct. 29, 2020

(87) PCT Pub. No.: WO2020/055395
PCT Pub. Date: Mar. 19, 2020

(65) Prior Publication Data
US 2021/0363414 A1 Nov. 25, 2021

(51) Int. Cl.
*C09K 8/70* (2006.01)
*C09K 8/74* (2006.01)
*C09K 8/88* (2006.01)

(52) U.S. Cl.
CPC .................. *C09K 8/70* (2013.01); *C09K 8/74* (2013.01); *C09K 8/882* (2013.01)

(58) Field of Classification Search
None
See application file for complete search history.

(56) References Cited

U.S. PATENT DOCUMENTS 7,775,278 B2   8/2010   Willberg et al.
9,617,462 B2   4/2017   Tashiro et al.
(Continued)

FOREIGN PATENT DOCUMENTS

WO   2017006077   1/2017
WO   2017086905   5/2017

OTHER PUBLICATIONS

ISRWO International Search Report and Written Opinion for PCT/US2018/050672 dated Jun. 7, 2019.
(Continued)

*Primary Examiner* — Andrew Sue-Ako
(74) *Attorney, Agent, or Firm* — Thomas Rooney; C. Tumey Law Group PLLC

(57) ABSTRACT

Methods and compositions for treating a well. A method comprising: introducing a treatment fluid into a wellbore penetrating a subterranean formation wherein the treatment fluid comprises: a base fluid; and multi-functional diverter particulates, wherein the multi-functional diverter particulates comprise a polyvinyl alcohol and a well service additive; and diverting at least a portion of the treatment fluid and/or a subsequently introduced fluid away from the zone. A treatment fluid comprising: a base fluid; and a multi-functional diverter particulate, wherein the multi-functional diverter particulates comprise a polyvinyl alcohol and a well service additive.

19 Claims, 2 Drawing Sheets

(56) References Cited

U.S. PATENT DOCUMENTS

| | | | |
|---|---|---|---|
| 2004/0043906 A1* | 3/2004 | Heath | C09K 8/536 |
| | | | 507/200 |
| 2006/0172894 A1 | 8/2006 | Mang et al. | |
| 2009/0054548 A1* | 2/2009 | Wang | C08L 3/08 |
| | | | 604/364 |
| 2012/0067581 A1* | 3/2012 | Auzerais | C04B 40/0633 |
| | | | 507/224 |
| 2014/0116702 A1 | 5/2014 | Tang | |
| 2015/0027703 A1* | 1/2015 | Zhu | C09K 8/68 |
| | | | 507/230 |
| 2017/0121589 A1 | 5/2017 | Reddy et al. | |
| 2017/0349821 A1* | 12/2017 | Wei | C09K 8/92 |
| 2019/0093000 A1 | 3/2019 | Agashe et al. | |
| 2019/0233719 A1 | 8/2019 | Eoff et al. | |
| 2020/0002603 A1 | 1/2020 | Eoff et al. | |
| 2020/0071605 A1* | 3/2020 | Ghebremeskel | E21B 33/138 |

OTHER PUBLICATIONS

REAL Divert, Baker, 2020, available at https://www.bakerhughes.com/integrated-well-services/integrated-well-construction/drilling/drilling-rig-equipment-and-services/onshore-drilling-systems/diverters.

Fractech, NuFlow, 2016, available at https://www.nuflowtech.com/how-nu-flow-works/product-overview.

Broadband, Schlumberger, 2020, available at https://www.slb.com/completions/stimulation/fracturing-services/broadband-services#related-information.

Trivert, Trican, 2017, available at https://www.tricanwellservice.com/products/trivert-diverting-agent.

TBlocksure, Weatherford, 2015, available at https://www.weatherford.com/en/products-and-services/completions/multistage-fracturing/stimulation-services/fluid-systems.

BioVert, Halliburton, 2011, available at https://www.halliburton.com/content/dam/ps/public/pe/contents/Data_Sheets/web/H/H08003.pdf.

* cited by examiner

MULTI-FUNCTIONAL DIVERTER PARTICULATES

BACKGROUND

After a wellbore is drilled and completed in a zone of a subterranean formation, it may often be necessary to introduce a treatment fluid into the zone. As used herein "zone" simply refers to a portion of the formation and does not imply a particular geological strata or composition. For example, the producing zone may be stimulated by introducing a hydraulic fracturing fluid into the producing zone to create fractures in the formation, thereby increasing the production of hydrocarbons therefrom. In another example, a producing zone may require an acid treatment to enhance fractures already present in the formation. To insure that the producing zone is uniformly treated with the treatment fluid, a treatment fluid including a diverting particulate may be used to ensure the treatment fluid contacts the entire zone requiring treatment. A subterranean formation may have sections of varying permeability, reservoir pressures and/or varying degrees of formation damage, and thus may accept varying amounts of certain treatment fluids. For example, low reservoir pressure in certain areas of a subterranean formation or a rock matrix or a proppant pack of high permeability may permit that portion to accept larger amounts of certain treatment fluids. It may be difficult to obtain a uniform distribution of the treatment fluid throughout the entire treatment interval. For instance, the treatment fluid may preferentially enter portions of the interval with low fluid flow resistance at the expense of portions of the treatment interval with higher fluid flow resistance. In some instances, these intervals with variable flow resistance may be water-producing intervals.

In some methods of treating such subterranean formations, once the less fluid flow-resistant portions of a subterranean formation have been treated, that area may be sealed off using a variety of techniques to divert treatment fluids to more fluid flow-resistant portions of the interval. Such techniques may have involved, among other things, the injection of particulates, foams, emulsions, plugs, packers, or blocking polymers (e.g., crosslinked aqueous gels) into the interval so as to plug off high-permeability portions of the subterranean formation once they have been treated, thereby diverting subsequently injected fluids to more fluid flow-resistant portions of the subterranean formation.

In some techniques, a degradable polymer may be introduced into the wellbore and subsequently into the subterranean formation to bridge fractures and perforations to provide the diversion. Oftentimes, it is preferable to remove the degradable polymers after the treatment is completed to ensure maximum flow of formation fluids into the wellbore. Any degradable polymers remaining in the treated zone may reduce the effective permeability of the zone and thereby decrease formation fluid production rates.

BRIEF DESCRIPTION OF THE DRAWINGS

These drawings illustrate certain aspects of some of the present disclosure, and should not be used to limit or define the disclosure.

DETAILED DESCRIPTION

Figure 1:
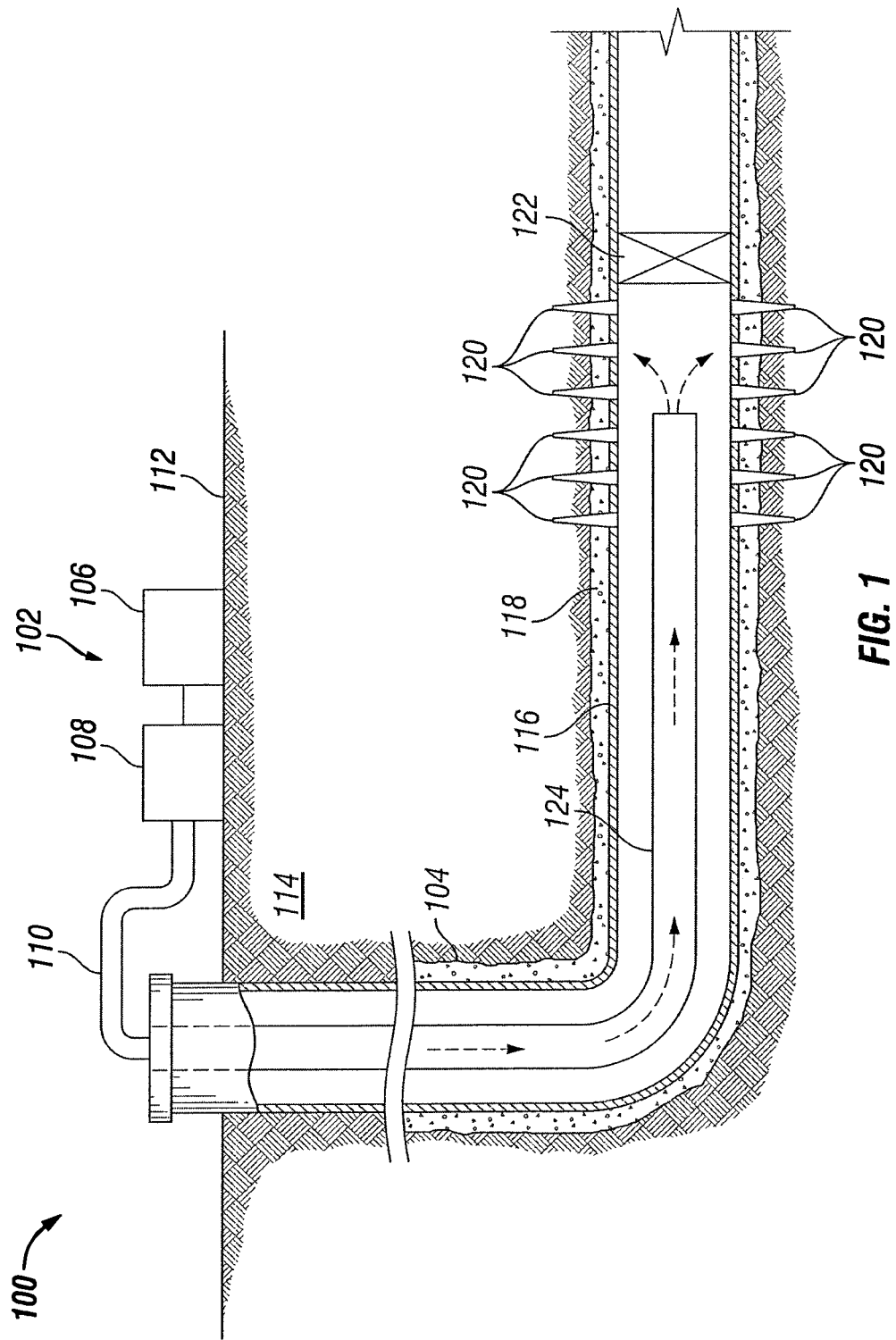
FIG. 1 is a schematic illustration of example well system showing placement of a treatment fluid into a wellbore.

The present disclosure is directed to subterranean treatments, and, at least in part, to using multi-functional diverter particulates for controlling flow of fluids in wellbore applications, such as in diversion applications. Although many degradable polymers have been previously used in diversion applications, there are several drawbacks such as high cost, low availability, and undesirable dissolution kinetics, among others. Herein, the use of multi-functional diverter particulates including polyvinyl alcohol (PVA) is disclosed. The multi-functional diverter particulates may be used in fracturing, acidizing, and other wellbore operations to control the area of the formation where a treatment fluid is applied or acting on. An operator may choose to apply a multi-functional diverter particulate to a particular formation zone to block off the treatment fluid from acting in that zone. A multi-functional diverter particulate may be provided to plug perforations or bridge fractures in the formation thereby diverting the flow of a treatment fluid to another formation zone or flow path. Multi-functional diverter particulates may be delivered downhole by any suitable method. A non-limiting example may include, by way of treatment fluid. Among other things, multi-functional diverter particulates that include PVA may have improved diversion, more rapid dissolution kinetics, especially at low temperatures, and reduced costs as compared to conventional diverting particulates. The multi-functional diverter particulates may be suitable for use at a variety of different downhole temperatures. For example, the multi-functional diverting particulates may be suitable for use in subterranean formations (or particular zones thereof) with temperature of about 350° F. (177° C.) or less, for example, ranging from 350° F. (177° C.) to 75° F. (25° C.). In an embodiment, the multi-functional diverting particulates may be suitable for use at low temperatures, for example, at bottom hole temperatures of about 150° F. (65° C.) or less.

The treatment fluid may be any suitable treatment fluid for use in a variety of downhole applications. Suitable downhole applications may include, but are not limited to, drilling operations, lost circulation management operations, stimulation operations, sand control operations, perforating operations, completion operations, acidizing operations, scale inhibiting operations, water-blocking operations, clay stabilizer operations, fracturing operations, frac-packing operations, gravel packing operations, wellbore strengthening operations, sag control operations, displacing solids laden drilling fluid, the like, and/or any combinations thereof. The treatment fluid may have a density of about 5.5 lb/gal (0.6 kg/L) or greater. Suitable treatment fluids may have a density at a point in range of from about 7.5 lb/gal (0.9 kg/L) to about 18.5 lb/gal (2.2 kg/L).

The treatment fluid may include a base fluid and a multi-functional diverter particulate. Examples of suitable base fluids may be aqueous or non-aqueous. Suitable non-aqueous fluids may include one or more organic liquids, such as hydrocarbons (e.g., kerosene, xylene, toluene, or diesel), oils (e.g., mineral oils or synthetic oils), esters, and the like. Suitable aqueous base fluids may include, without limitation, water, freshwater, saltwater, brine, seawater, or any other suitable base fluids that preferably do not undesirably interact with the other components used in the treatment fluids. The base fluid may be present in the treatment fluids in an amount in the range of from about 25% to about 99.95% by volume of the treatment fluid. Optionally, the base fluid may be present in the treatment fluids in an amount in the range of from about 30% to about 75% by volume of the treatment fluid.

The treatment fluid may further include a multi-functional diverter particulate, which may include polyvinyl alcohol, a plasticizer, and/or a well service additive. The diverter particulate is considered "multi-functional" because in addition to the polyvinyl alcohol, the diverter particulate includes the well service additive that performs one or more specific functions downhole. For example, the polyvinyl alcohol may be included in the diverter particulate to provide diversion with desirable removal characteristics, the well service additive provides the diverter particulate with additional secondary benefits. By incorporating well services additives, such as surfactants, scale inhibitors, biocides, sulfide scavengers, sludge inhibitors, chelating agents, and defoamers, among others, into the diverter particulate with the polyvinyl alcohol, the diverter particular should release this well service additive upon degradation of the polyvinyl alcohol. As the degradation may be temperature dependent, the diverter particulate may have a fast release at high bottom hole static temperatures (e.g., about 150° F. to about 350° F.) or have a long term release in low temperature holes (e.g., about 80° F. to about 150° F.). It should be noted that "fast release" as used herein is understood to mean release in a time period of about a few hours. In an embodiment, fast release may mean a release over a time period of about 1 hour to about 18 hours. It should be noted that "long term release" as used herein is understood to mean release in a time period of about a day or longer.

Multi-functional diverter particulates are typically solid in form. Multi-functional diverter particulates may be present in the treatment fluid in any amount for a particular application. Suitable amounts may include, but are not limited to, an amount of about 0.05% to about 75% by volume of the treatment fluid. In other examples, the multi-functional diverter particulates may be present in the treatment fluid in an amount of about 0.05% to about 10% by volume of the treatment fluid, about 10% to about 20% by volume of the treatment fluid, about 20% to about 30% by volume of the treatment fluid, about 30% to about 40% by volume of the treatment fluid, or about 40% to about 50% by volume of the treatment fluid, or about 50% to about 60% by volume of the treatment fluid, or about 60% to about 75% by volume of the treatment fluid. These ranges encompass every number in between, for example. For example, the multi-functional diverter particulates may be present in the treatment fluid in an amount ranging from about 0.5% to about 65% by volume of the treatment fluid. One of ordinary skill in the art with the benefit of this disclosure should be able to select an appropriate amount of the multi-functional diverter particulates to use for a particular application.

Multi-functional diverter particulates may be any suitable size capable of functioning as a diverting particulate. Suitable sizes may include a $D_v50$ particle size in the range from about 0.01 microns to about 300 microns, or from about 300 microns to about 10 millimeters, or from about 300 microns to about 2.5 millimeters, or from about 1 millimeter to about 10 millimeters. The $D_v50$ particle size may also be referred to as the median particle size by volume of a particulate material. The $D_v50$ particle size is defined as the maximum particle diameter below which 50% of the material volume exists. The $D_v50$ particle size values for a particular sample may be measured by commercially available particle size analyzers such as those manufactured by Malvern Instruments, Worcestershire, United Kingdom. Optionally, the multi-functional diverter particulate may have a $D_v50$ particle size that ranges in size from about 1 millimeter to about 5 millimeters, or from about 3 millimeters to about 10 millimeters. Multi-functional diverter particulates may be any suitable shape. Suitable shapes may include, but are not limited to, any physical shape as well as an irregular geometry, including the physical shape of platelets, shavings, fibers, flakes, ribbons, rods, strips, spheroids, beads, toroids, oviods, spheres, cylinders, tablets, wafers, or any other physical shape. In an embodiment, the multi-functional diverter particulates may have an aspect ratio of about 1:1 to about 500:1, for example, ranging from about 5:1 to about 10:1, or about 1:1 to about 10:1, or about 5:1 to about 20:1, or about 1:1 to about 200:1, or about 1:1 to about 500:1, or about 200:1 to about 500:1. It should be noted that any suitable aspect ratio within the given range above may be used.

Multi-functional diverter particulates may include PVA, which may be considered a degradable polymer. The PVA may be at least partially degradable. The terms "polymer" or "polymers" as used herein do not imply any particular degree of polymerization; for instance, oligomers are encompassed within this definition. A polymer is considered to be "degradable" herein if it is capable of undergoing an irreversible degradation when used in subterranean applications, e.g., in a wellbore. The term "irreversible" as used herein means that the degradable polymer should degrade in situ (e.g., within a wellbore) but should not recrystallize or reconsolidate in situ after degradation (e.g., in a wellbore).

Degradable polymers may include, but are not be limited to, dissolvable materials, materials that deform or melt upon heating such as thermoplastic materials, hydrolytically degradable polymers, materials degradable by exposure to radiation, materials reactive to acidic fluids, or any combination thereof. In some embodiments, degradable polymers may be degraded by temperature, presence of moisture, oxygen, microorganisms, enzymes, pH, free radicals, and the like. In some embodiments, degradation may be initiated in a subsequent treatment fluid introduced into the subterranean formation at some time when diverting is no longer necessary. In some embodiments, degradation may be initiated by a delayed-release acid, such as an acid-releasing degradable polymer or an encapsulated acid, and this may be included in the treatment fluid including the polyvinyl alcoohol so as to reduce the pH of the treatment fluid at a desired time, for example, after introduction of the treatment fluid into the subterranean formation.

The PVA may be characterized by degree of dissolve, weight average molecular weight, or a combination of the two. The PVA may have any suitable degree of dissolve for a particular application, including but not limited to, about 84 to about 99.5, or about 87 to about 95, or about 89 to about 97. The PVA may have any suitable weight average molecular weight for a particular application, including but not limited to, about 10,000 to about 200,000, or about 10,000 or less, or about 200,000 or greater. With the present disclosure, one skilled in the art would be able to select an appropriate PVA for a particular application.

PVA may be a solid material that may be manufactured in many forms, such as, for example, any physical shape as well as an irregular geometry, including the physical shape of platelets, shavings, fibers, flakes, ribbons, rods, strips, spheroids, beads, sheets, granules, powder, toroids, oviods, spheres, cylinders, tablets, wafers, or any other physical shape, and the like. PVA may be a synthetic polymer that may be water soluble and generally unaffected by petroleum hydrocarbons. The polymer includes a carbon chain backbone with hydroxyl and acetate groups. PVA may be produced by the dissolve of polyvinyl acetate in methanol catalyzed by a base. PVA may exist in three different aggregation states, which may be controlled by solution conditions. In a solid state, PVA may be semi-crystalline. The degree of crystallinity varies from one mode of manufacture to another and with the degree of dissolve and grade of the PVA. In aqueous solution, PVA may lose crystallinity and swell to form an amorphous structure, which may be flexible and malleable, but not yet solubilized. Depending on solution conditions, PVA may solubilize completely and exist as polymer strands in solution.

Dissolution of PVA may be dependent on a number of factors, including, but not limited to, the degree of dissolve, molecular weight, crystallinity, particle size, exposure temperature, and the like of the PVA. The degree of dissolve may be defined as the mole percent of hydroxyl groups on the polymer chain in relation to the non-hydrolyzed acetate groups. For example, PVA with a degree of dissolve of 88 would have 88 mole percent hydroxyl groups and 12 mole percent acetate groups along the polymer backbone. The hydroxyl and/or acetate groups may be distributed randomly or in blocks. Other factors affecting PVA solubility may include polymer concentration and salt concentration; the amount of unsolubilized PVA, e.g., amorphous PVA, may increase with increased concentrations of salt or polymer. The crystallinity of the PVA may also be used to control the rate at which the PVA will dissolve at various temperatures.

The PVA may be present in the multi-functional diverting particulate in any suitable amount, including, but not limited to, an amount in the range of from about 50% to about 99.999% by weight of the multi-functional diverting particulate. PVA may be present in the range from about 60% to about 90%, or about 90% to about 100%, or about 85% to about 95% by weight of multi-functional diverting particulate. Suitable amounts of degradable present in the multi-functional diverting particulate may include, but are not limited to, about 60%, about 70%, about 80%, about 85%, about 90%, about 95%, about 98%, about 99%, or about 100% by weight of multi-functional diverting particulate. It should be noted that these ranges encompass every number in between. In an embodiment, the multi-functional diverting particulate may include more than one PVA. Each PVA in the multi-functional diverting particulate may be present in any suitable amount.

In an embodiment, the multi-functional diverter particulate may include a plasticizer. The plasticizer is an additive included in the diverter particulate to plasticize the PVA, for example, by reduction of the melting point of the multi-functional diverter particulate which may allow the PVA to be extruded into a desired shape and or size without experiencing degradation. Additionally, the plasticizer may provide a softer, more swellable PVA which may experience more rapid dissolution. Where the PVA is plasticized, the multi-functional diverter particulate may be referred as a "plasticized diverter particulate." The plasticizer may stabilize the PVA in the diverter particulate. In certain embodiments, the plasticizer may reduce the melting point of PVA below its degradation point, allowing for the the PVA, to be liquefied and processed through an extruder to form larger particles of the PVA than is possible without the plasticizer. In some embodiments, the plasticizer may be a surfactant. Plasticizers suitable for certain embodiments of the present disclosure may include, but are not limited to glycol, polyethylene glycol, polypropylene glycol, fatty acid esters, lactide monomers, glycolide monomers, citric acid esters, epoxidized oil, adipate ester, azaleate. Suitable amounts of plasticizers present in the multi-functional diverter particulate may include, but are not limited to, about 0.001% to about 10%, about 0.001% to about 5%, about 5% to about 10% by weight of multi-functional diverter particulate. It should be noted that these ranges encompass every number in between. Plasticizer may be present in an amount of about 0.001%, about 1%, about 2%, about 4%, about 6%, about 8%, or about 10% by weight of multi-functional diverter particulate.

The multi-functional diverter particulate may further include a well service additive, which may be beneficial for treating and/or stimulating a wellbore. Any suitable well service additives may be used, including but not limited to, surfactants, scale inhibitors, biocides, sulfide scavengers, sludge inhibitors, chelating agents, acids, bases, buffers, breakers, demulsifiers, defoamers, corrosion inhibitors, clay control agents, and/or any combination thereof. Specific examples of suitable well service additives may include but are not limited to, acrylic acid polymers, maleic acid polymers, phosphonates, the like, and/or any combination thereof Additional additives may be present in the multi-functional diverter particulate in any suitable amount, including but not limited to, about 0.001% to about 70%, or about 0.001% to about 25%, or about 25% to about 50%, or about 50% to about 70% by weight of the multi-functional diverter particulate. In an embodiment, at least two additional additives or more of the well service additives may be present in the multi-functional diverter particulate. With the benefit of this disclosure, one of ordinary skill in the art should be able to recognize and select suitable well service additives for use in the multi-functional diverter particulate.

Surfactants may be useful for a wide variety of applications, including but not limited to, lowering the surface tension between one or more fluids and/or one and more fluids and solids found in the wellbore. Any suitable surfactant may be used in the multi-functional diverting additive, including but not limited to, alkali metal alkylene acetates, sultaines, ether carboxylates, alpha-olefin sulfonates, cocamidopropyl betaine, ethoxylated alcohols, ethoxylated amines, ammonium alkyl ether sulfates, lauryl hydroxysultaine, linear alcohols, nonylphenol compounds, alkoxylated fatty acids, alkylphenol alkoxylates, ethoxylated amides, ethoxylated alkyl amines, betaines, methyl ester sulfonates, hydrolyzed keratin, sulfosuccinates, taurates, amine oxides, alkoxylated fatty acids, alkoxylated alcohols, lauryl alcohol ethoxylate, ethoxylated nonyl phenol, ethoxylated fatty amines, ethoxylated alkyl amines, cocoalkylamine ethoxylate, modified betaines, alkylamidobetaines, cocamidopropyl betaine, quaternary ammonium compounds, trimethyltallowammonium chloride, trimethylcocoammonium chloride, and/or any combination thereof.

Scale inhibitors may be useful for preventing or slowing the deposition of sale on equipment used downhole. Any suitable scale inhibitor may be used in the multi-functional diverting additive, including but not limited to, hexamethylene diamine tetrakis (methylene phosphonic acid), poly (aspartic acid), diethylene triamine tetra (methylene phosphonic acid), diethylene triamine penta (methylene phosphonic acid), polyacrylic acid (PAA), phosphino carboxylic acid (PPCA), diglycol amine phosphonate (DGA phosphonate), 1-hydroxy ethylidene 1,1-diphosphonate (HEDP phosphonate), bisaminoethylether phosphonate (BABE phosphonate) and 2-acrylamido-2-methyl-1-propanesulphonic acid (AMPS), nitrilotris(methylenephosphonic acid) (NTMP), ethylenediamine tetra(methylene phosphonic acid) (EDTMP), and diethylenetriaminepentakis (methylphosphonic acid) (DTPMP). Other scale inhibitors include acrylic acid polymers; maleic acid polymers; PBTC (phosphonobutane-1,2,4-tricarboxylic acid); ATMP (aminotrimethylene phosphonic acid); HEDP (1-hydroxyethylidene-1,1-diphosphonic acid), polyacrylic acid (PAA), phosphinopolyacrylates (such as PPCA); polymaleic acids (PMA); maleic acid terpolymers (MAT); sulfonic acid copolymers, such as SPOCA (sulfonated phosphonocarboxylic acid); polyvinyl sulfonates, and Poly-Phosphono Carboxylic acid (PPCA), N-Phosphonomethyl iminodiacetic acid (PMIDA), and combinations thereof.

Biocides may be useful for killing microorganisms, especially bacteria, or interfere with their growth to prevent undesired growth downhole. Any suitable biocide may be used in the multi-functional diverting additive, including but not limited to, quaternary ammonium compounds, chlorine, hypochlorite solutions, and compounds like sodium dichloro-s-triazinetrione. An example of a biocide that may be used in subterranean applications is glutaraldehyde.

Sulfide scavengers may be useful for removing hydrogen sulfide. Any suitable sulfide scavenger may be used in the multi-functional diverting additive, including but not limited to, zinc-based materials, iron-based materials, triazine, aldehydes, sodium nitrate, and combinations thereof.

Sludge inhibitors may be useful for reducing the amount of sludge that may form during acidizing operations. Any suitable sludge inhibitor may be used in the multi-functional diverting additive, including but not limited to, solvents, such as xylene.

Chelating agents may be useful for preventing the undesired precipitation of materials downhole. Any suitable chelating agent may be used in the multi-functional diverting additive, including but not limited to, ethylenediamine tetraacetic acid (EDTA), hydroxyethylenediaming triacetic acid (HEDTA), nitriolotriacetic acid (NTA), citric acid, methyl glycine diacetic acid (MGDA), glycine diacetic acid (GLDA), or any poly-amino poly acetic acid, and/or combinations thereof.

Defoamers may be useful for preventing the undesired gas entrainment in fluids. Any suitable defoamer may be used in the multi-functional diverting additive, including but not limited to, polyol silicone compounds, siloxanes such as polydimethyl siloxane, acetylenic diols, and/or combinations thereof.

Corrosion inhibitors may be useful for preventing or slowing the corrosion of equipment used downhole. Any suitable corrosion inhibitor may be used in the multi-functional diverting additive, including but not limited to, acetylenic alcohols, Mannich condensation products (such as those formed by reacting an aldehyde, a carbonyl containing compound and a nitrogen containing compound), unsaturated carbonyl compounds, unsaturated ether compounds, formamide, formic acid, formates, other sources of carbonyl, iodides, terpenes, and aromatic hydrocarbons, coffee, tobacco, gelatin, cinnamaldehyde, cinnamaldehyde derivatives, propargyl alcohol, fluorinated surfactants, quaternary derivatives of heterocyclic nitrogen bases, quaternary derivatives of halomethylated aromatic compounds, formamides, combinations of such compounds used in conjunction with iodine; quaternary ammonium compounds; and combinations thereof.

Clay control agents may be useful for inhibiting the swelling of clays, thus the undesired gas entrainment in fluids. Any suitable defoamer may be used in the multi-functional diverting additive, including but not limited to, quaternary ammonium salts, potassium formate, saccharide derivatives, amine salts of maleic imide, anionic polymers, polyoxyalkylene amines, grafted copolymers, and combinations thereof.

Any suitable technique may be used for preparation of the multi-functional diverter particulates. Suitable techniques may include, but are not limited to, extrusion, pelletizing, agglomeration, the like, and/or any combination thereof. In an embodiment, the multi-functional diverter particulate may be formed by way of heat extrusion. At least one additional additive may be mixed into the PVA. The at least one well service additive and the PVA may then be heated to partially melt (e.g. soften) the at least one additive and the PVA. The partially melted well service additive and PVA may then be extruded to form the multi-functional diverter particulate. In an embodiment, the plasticizer may be pre-mixed with the PVA and may then be extruded to form the multi-functional diverter particulate. In an embodiment, the plasticizer and the PVA may be co-injected into an extrusion process thereby forming the multi-functional diverter particulate. The multi-functional diverter particulate may be a composite particle solid in form. In an embodiment, the multi-functional diverter particulate may be formed by compressing, molding, or otherwise agglomerating smaller particles of the well service additive and particles of the PVA into larger particulates that may be considered pellets. Suitable pelletization techniques may include, but are not limited to, agitation (i.e. balling, directed pelletization through centrifugation, etc.), compaction (i.e. compression, extrusion, etc.), layering (i.e. powder layering, solution/suspension layering, etc.), globulation (i.e. spray drying, spray congealing, etc.), and the like The pellets of the at least one well service additive and PVA may be solid in form. In an embodiment, a binder may be necessary when pelletizing the PVA and well service additive to help hold the agglomeration together. Suitable binders may include, but are not limited to, sucrose, gelatin, starch, additional synthetic water-soluble polymers, microcrystalline cellulose, the like, and/or any combination thereof.

As previously mentioned, it may be preferable that a multi-functional diverter particulate introduced into the wellbore be at least partially dissolvable, degradable, or removable to ensure production of formation fluids may be minimally affected by the multi-functional diverter particulate. When the multi-functional diverter particulate is soluble in water, the multi-functional diverter particulate may be readily removed from the formation by waiting until the multi-functional diverter particulate is dissolved. Where the multi-functional diverter particulate is slightly soluble or may become soluble under certain conditions, a chemical agent that increases the solubility of the multi-functional diverter particulate may be included. At bottomhole static (BHST) temperatures of about 150° F. (about 65° C.) to about 300° F. (about 150° C.) the dissolution of the multi-functional diverter particulate may be considered fast. As used herein, "fast" refers to a time period of about a day or less. At temperatures of about 85° F. (about 30° C.) to about 130° F. (about 55° C.) the dissolution of the multi-functional diverter particulate may be slow. As used herein, "slow" refers to a time period of about at least one month or greater. Any chemical agent capable of increasing the dissolution rate of the multi-functional diverter particulate may be included. In a non-limiting example, the chemical agent may be, an inert dissolvable material, a dissolution accelerator, the like, or any combination thereof. In examples where the multi-functional diverter particulate is insoluble in water, the multi-functional diverter particulate may still allow production of formation fluids and provide additional beneficial properties to the near wellbore region such as propping of fractures.

In an embodiment, the multi-functional diverter particulate may further include a dissolution accelerator. Any suitable dissolution accelerator capable of increasing the overall dissolution rate of the multi-functional diverter particulate downhole may be used. Suitable dissolution accelerators may include, but are not limited to, inorganic acids, solid organic acids, simple saccharides, metal salts, the like, and/or any combination thereof. Suitable solid inorganic acids may include sulfamic acid. Suitable solid organic acids may include citric acid, ethylenediaminetetra-acetic acid (EDTA), N-Phosphonomehyl iminodiacetic acid (PMIDA), anhydrides, ortho esters, phosphonate esters, the like, and/or any combination thereof. Suitable simple saccharides, such as monosaccharides and disaccharides, may include glucose, fructose, galactose, sucrose, and lactose. Combinations of suitable dissolution accelerators may also be used. Dissolution accelerators may be present in any suitable amount including, but not limited to, 0.001% to about 50% by weight of the multi-functional diverter particulate, or about 1% to about 10% by weight of the multi-functional diverter particulate, or about 10% to about 20% by weight of the multi-functional diverter particulate, or about 20% to about 30% by weight of the multi-functional diverter particulate, or about 30% to about 40% by weight of the multi-functional diverter particulate, or about 40% to about 50% by weight of the multi-functional diverter particulate.

Without limitation, placing the multi-functional diverter particulate into the subterranean formation may include placement into a wellbore or into the region of the subterranean formation surrounding the wellbore. In the subterranean formation, the multi-functional diverter particulate may form a barrier to fluid flow. Without limitation, this barrier to fluid flow may be used for controlling fluid, for example, in diversion to divert treatment fluids to another area, or in fluid loss control to reduce leak off into the subterranean formation. Advantageously, the multi-functional diverter particulate may be degradable so that they may be easily removed from the subterranean formation to facilitate production, for example, without the need for additional removal applications.

In an embodiment, the treatment fluid may be an acidic treatment fluid. The treatment fluid may be an aqueous acid treatment fluid, for example, when used in acidizing treatments. By way of example, the treatment fluid may include one or more acids, including, but not limited to, mineral acids, such as hydrochloric acid and hydrofluoric acid, organic acids, such as acetic acid, formic acid, and other organic acids, urea complexes, such as urea hydrochloride, chelating acids, such as ethylenediamine tetracetic acid, or mixtures thereof. In acidizing treatments, mixtures of hydrochloric acid and hydrofluoric may be used, in some instances.

In an embodiment, the treatment fluid may include a friction reducing polymer. The friction reducing polymer may be included in the treatment fluid to form a slickwater fluid, for example. The friction reducing polymer may be a synthetic polymer. Additionally, for example, the friction reducing polymer may be an anionic polymer or a cationic polymer. By way of example, suitable synthetic polymers may include any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters, and combinations thereof. Without limitation, the friction reducing polymer may be included in the treatment fluid to provide a desired amount of friction reduction. For example, the friction reducing polymer may be included in the treatment fluid, for example, in an amount equal to or less than 0.3% by weight of an aqueous-based fluid present in the treatment fluid. Without limitation, the friction reducing polymer may be included in the treatment fluid in an amount sufficient to reduce friction without gel formation upon mixing. By way of example, the treatment fluid including the friction reducing polymer may not exhibit an apparent yield point.

In an embodiment, the treatment fluid may include a gelling agent. The gelling agent may be included in the treatment fluid to form an aqueous gel, foamed gel, or oil gel, for example. Suitable gelling agents may include any polymeric material capable of increasing the viscosity of a base fluid, such as an aqueous fluid. Without limitation, the gelling agent may include polymers that have at least two molecules that may be capable of forming a crosslink in a crosslinking reaction in the presence of a crosslinking agent, and/or polymers that have at least two molecules that are so crosslinked (i.e., a crosslinked gelling agent). Other suitable gelled fluids may include linear gels that are not crosslinked. The gelling agents may be naturally-occurring, synthetic, or a combination thereof. Suitable gelling agents may include polysaccharides, and derivatives thereof that contain one or more of these monosaccharide units: galactose, mannose, glucoside, glucose, xylose, arabinose, fructose, glucuronic acid, or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), and combinations thereof. The gelling agents include an organic carboxylated polymer, such as CMHPG. Additionally, polymers and copolymers that include one or more functional groups (e.g., hydroxyl, cis-hydroxyl, carboxylic acids, derivatives of carboxylic acids, sulfate, sulfonate, phosphate, phosphonate, amino, or amide groups) may be used. Where used, the gelling agent may be present in the treatment fluids in an amount sufficient to provide the desired viscosity. Without limitation, the gelling agents may be present in an amount in the range of from about 0.10% to about 10% by weight of the treatment fluid and, alternatively, from about 0.5% to about 4% by weight of the treatment fluid.

In an embodiment, a crosslinking agent may be included in the treatment fluids where it is desirable to crosslink the gelling agent. The crosslinking agent may include a metal ion that is capable of crosslinking al least two molecules of the gelling agent. Examples of suitable crosslinking agents include, but are not limited to, borate ions, zirconium IN ions, titanium IV ions, aluminum ions, antimony ions, chromium ions, iron ions, copper ions, magnesium ions, and zinc ions. These ions may be provided by providing any compound that is capable of producing one or more of these ions; examples of such compounds include, but are not limited to, boric acid, disodium octaborate tetrahydrate, sodium diborate, pentaborates, ulexite, colemanite, zirconiwn lactate, zirconium triethanol amine, zirconium lactate triethanolamine, zirconium carbonate, zirconium acetvlacetonate, zirconium maleate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, aluminum citrate, antimony compounds, chromium compounds, iron compounds, copper compounds, zinc compounds, and combinations thereof. Without limitation, the crosslinking agent may be formulated to remain inactive until it is "activated" by, among other things, certain conditions in the fluid (e.g., pH, temperature, etc.) and/or contact with some other substance. Without limitation, the crosslinking agent may be delayed by encapsulation with a coating (e,g., a porous coating through which the crosslinking gent may diffuse slowly, or a degradable coating that degrades downhole) that delays the release of the crosslinking agent until a desired time or place. The choice of a particular crosslinking agent will be governed by several considerations that will be recognized by one skilled in the art, including but not limited to the following: the type of gelling agent included, the molecular weight of the gelling agent(s), the pH of the treatment fluid, temperature, and/or the desired time for the crosslinking agent to crosslink the gelling agent molecules.

Where used, suitable crosslinking agents may be present in the treatment fluids in an amount sufficient to provide, inter alia, the desired degree of crosslinking between molecules of the gelling agent. Without limitation, the crosslinking agent may be present in the treatment fluids in an amount in the range of from about 0.0005% to about 0.2% by weight of the treatment fluid or alternatively from about 0.001% to about 0.05% by weight of the treatment fluid. One of ordinary skill in the art, with the benefit of this disclosure, should recognize the appropriate amount of crosslinking agent to include in a treatment fluid based on, among other things, the temperature conditions of a particular application, the type of gelling agents used, the molecular weight of the gelling agents, the desired degree of viscosification, and/or the pH of the treatment fluid.

In an embodiment, the treatment fluid may further include a gel breaker, which may be useful for reducing the viscosity of the viscosified fracturing fluid at a specified time. A gel breaker may include any compound capable of lowering the viscosity of a viscosified The term "break" (and its derivatives) as used herein refers to a reduction in the viscosity of the viscosified treatment fluid, e.g., by the breaking or reversing of the crosslinks between polymer molecules or some reduction of the size of the gelling agent polymers. No particular mechanism is implied by the term. Suitable gel breaking agents for specific applications and gelled fluids are known to one skilled in the arts. Nonlimiting examples of suitable breakers include oxidizers, peroxides, enzymes, acids, and the like. Some viscosified fluids also may break with sufficient exposure of time and temperature.

Example methods of using the multi-functional diverter particulate will now be described in more detail. As previously described, the multi-functional diverter particulate may be placed in the subterranean formation such that a barrier to fluid flow may be formed. Without limitations, the multi-functional diverter particulate may form packs, bridges, filter cakes, or other suitable barriers to thereby obstruct fluid flow. Without limitation, this barrier to fluid flow may be used, for example, in diversion to divert treatment fluids to another area and in fluid loss control to reduce leak off into the subterranean formation. The fluid flow preventing barrier may be formed in the subterranean formation to block certain flow paths in the subterranean formation, reducing the flow of fluids through the subterranean formation. Examples of the types of flow paths that may be blocked by the fluid flow preventing barrier include, but are not limited to, perforations, such as those formed by a perforation gun, fissures, cracks, fractures, micro fractures, streaks, flow channels, voids, vugs high permeable streaks, annular voids, or combinations thereof, as well as any other zone in the formation through which fluids may undesirably flow.

As will be appreciated by those of ordinary skill in the art, the multi-functional diverter particulate may be used in a variety of subterranean operations, where formation of a fluid flow diverting (or flow preventing) barrier may be desired, such as fluid diversion, and fluid loss control. Fluid diversion may be desired in a number of subterranean treatments, including fracturing and acidizing. Fluid loss control may be desired in a number of subterranean treatments, including, without limitation, drilling operations, fracturing operations, acidizing operations, work-over operations, and gravel packing operations. The multi-functional diverter particulate may be used prior to, during, or subsequent to a variety of subterranean operations. Methods of using the multi-functional diverter particulate may first include preparing a treatment fluid including the multi-functional diverter particulate. The treatment fluids may be prepared in any suitable manner, for example, by combining the multi-functional diverter particulate, base fluid, and any of the additional components described herein in any suitable order.

Methods may include introduction of the multi-functional diverter particulate into a subterranean formation. Introduction into the subterranean formation is intended to include introduction into a wellbore penetrating a subterranean formation, introduction into the zone(s) surrounding the wellbore, or both. A treatment fluid containing the multi-functional diverter particulate may dissipate into the subterranean formation through openings, which may be naturally occurring (e.g., pores, cracks, fractures, micro fractures fissures, etc.) or man-made. As the treatment fluid dissipates into the subterranean formation, the multi-functional diverter particulate may be screened out by the formation, whereby the multi-functional diverter particulate may be packed into the openings. In the subterranean formation, the multi-functional diverter particulate may form a flow preventing barrier that blocks certain flow paths therein, reducing the flow of fluids through the subterranean formation. Examples of the types of flow paths that may be blocked by the multi-functional diverter particulate include, but are not limited to, perforations, such as those formed by a perforation gun, fissures, cracks, fractures, micro fractures, streaks, flow channels, voids, high permeable streaks, annular voids, or combinations thereof, as well as any other zone in the formation through which fluids may undesirably flow. Methods may further include selecting one or more zones of the subterranean formation for control of fluid flow in which the multi-functional diverter particulate may be introduced. In an embodiment, additional treatment fluids may be introduced into the wellbore, wherein the treatment fluids may contain additional multi-functional diverter particulates or other diverting particulates. The multi-functional diverter particulates (or other diverting particulates) in each treatment fluid may be different sizes. In an embodiment, the first treatment fluid may include large multi-functional diverter particulates and each subsequent diverting particulate (or multi-functional diverter particulate) may decrease in size. In addition, additional solid diverting particulates (or multi-functional diverter particulates) may be included in each treatment fluid so that plugs may be formed with particles of different sizes.

The multi-functional diverter particulate may be used as fluid loss control agents, among others. Providing effective fluid loss control for subterranean treatment fluids may be highly desirable. "Fluid loss," as that term is used herein, refers to the undesirable migration or loss of fluids (such as the fluid portion of a drilling mud or cement slurry) into a subterranean formation and/or a proppant pack. Treatment fluids may be used in any number of subterranean operations, including drilling operations, cementing, fracturing operations, acidizing operations, gravel-packing operations, wellbore clean-out operations, pickling, and the like. Fluid loss may be problematic in any number of these operations. In fracturing treatments, for example, fluid loss into the formation may result in a reduction in fluid efficiency, such that the fracturing fluid cannot propagate the fracture as desired. Fluid loss control materials are additives that lower the volume of a filtrate that passes through a filter medium. That is, they block the pore throats and spaces that otherwise allow a treatment fluid to leak out of a desired zone and into an undesired zone. Particulate materials may be used as fluid loss control materials in subterranean treatment fluids to fill/bridge the pore spaces in a formation matrix and/or proppant pack and/or to contact the surface of a formation face and/or proppant pack, thereby forming a type of filter cake that blocks the pore spaces in the formation or proppant pack, and prevents fluid loss therein. Without limitation, when the multi-functional diverter particulates may be used as a fluid loss control agent, it may be used in conjunction with a fracturing or drilling operation. For example, the multi-functional diverter particulate may be included in a treatment fluid that is then placed into the portion of the subterranean formation at a pressure/rate sufficient to create or extend at least one fracture in that portion of the subterranean formation.

Multi-functional diverter particulates have similar actions but strive for a somewhat different approach. Multi-functional diverter particulates may be used to seal off a portion of the subterranean formation. By way of example, in order to divert a treatment fluid from permeable portions of the formation into the less permeable portions of the formation, a volume of treatment fluid may be pumped into the formation followed by multi-functional diverter particulate to seal off a portion of the formation where the first treatment fluid penetrated. When desired for diversion, the multi-functional diverter particulate may be added to the first treatment fluid or a slug of another treatment fluid may be prepared that contains the multi-functional diverter particulate. After the multi-functional diverter particulate is placed, a second treatment fluid may be placed wherein the second treatment fluid may be diverted to a new zone for treatment by the previously placed multi-functional diverter particulate. When being placed, the treatment fluid containing the multi-functional diverter particulate may flow most readily into the portion of the formation having the largest pores, fissures, or vugs, until that portion is bridged and sealed, thus diverting the remaining fluid to the next most permeable portion of the formation. These steps may be repeated until the desired number of stages of treating fluid has been pumped. In an embodiment, the multi-functional diverter particulate in the first treatment fluid may be smaller than the multi-functional diverter particulate in the second treatment fluid. In another instance, the multi-functional diverting particulate in the first treatment fluid may be larger than the multi-functional diverting particulate in the second treatment fluid, for example, by at least 5% or more. Without limitation, multi-functional diverter particulates may be included in treatment fluids introduced at matrix flow rates; that is, flow rates and pressures that are below the rate/pressure sufficient to create or extend fractures in that portion of a subterranean formation. Alternatively, the treatment fluids including multi-functional diverter particulate may be introduced above the fracturing pressure of the subterranean formation.

As previously described, the multi-functional diverter particulate may be used in fracturing treatments. A method of fracturing a wellbore may include placing a fracturing fluid into a portion of a wellbore. The fracturing fluid may be used to create or extend one or more fractures in the subterranean formation. The fracturing fluid may enter flow paths to create one or more primary fractures extending from the wellbore into the subterranean formation. Branches may extend from the primary fractures. A fracturing fluid, commonly referred to as a pre-pad or pad fluid, may be injected to initiate the fracturing of a subterranean formation prior to the injection of proppant particulates. The pre-pad or pad fluid may be proppant-free or substantially proppant-free. The proppant particulates may be suspended in a fracturing fluid which may be injected into the subterranean formation to create and/or extend at least one fracture. In order to create and/or extend a fracture, a fluid is typically injected into the subterranean formation at a rate sufficient to generate a pressure above the fracturing pressure.

In the fracturing treatment, it may be desired to plug previously formed flow paths in order to fracture additional portions of the subterranean formation. The multi-functional diverter particulate may be introduced into the subterranean formation to form a barrier that restricts entry of additional fracturing fluid within the previously formed flow paths. An example method may include introducing a fracturing fluid into a subterranean formation at or above a fracturing pressure of the subterranean formation. The method may further include introducing a multi-functional diverter particulate into the subterranean formation to thereby form a barrier that restricts fluid flow at a first location in the subterranean formation. The method may further include diverting the fracturing fluid to a second location in the subterranean formation. The multi-functional diverter particulate may be placed into the subterranean formation by forming a slug of a treatment fluid having a different composition than the fracturing fluid or by adding the multi-functional diverter particulate directly to the fracturing fluid, for example, creating a slug of the fracturing fluid including the multi-functional diverter particulate. The multi-functional diverter particulate may form a barrier at the first location to selectively place the fracturing fluid at one or more additional locations in the subterranean formation.

After a well treatment using the multi-functional diverter particulate, the wellbore and/or the subterranean formation may be prepared for production, for example, production of a hydrocarbon, therefrom. Preparing the wellbore and/or formation for production may include removing the multi-functional diverter particulate from one or more flow paths, for example, by allowing the multi-functional diverter particulate to degrade and subsequently recovering hydrocarbons from the formation via the wellbore. In an embodiment, the reservoir pressure may dislodge the multi-functional diverting particulate from one or more flow paths for flowback of the material to the surface. As previously described, the multi-functional diverter particulate may be degradable such that the barrier formed by the multi-functional diverter particulate may be removed. The PVA may be degraded by materials purposely placed in the formation by injection, mixing the degradable particle with delayed reaction degradation agents, or other suitable means previously described to induce degradation.

Removal of the multi-functional diverter particulates, if desired, may be affected by any number of suitable treatments. By way of example, the multi-functional diverter particulate may be removed by acid and/or by contact with oxidizers. Removal may include contacting the multi-functional diverter particulate with an oxidizer, such as persulfate, alkali metal chlorite or hypochlorite, peroxides, ammonium or metal chlorate, bromate, iodates or perchlorate, perbromate, or periodate. Without limitation, specific examples of suitable oxidizers may include sodium persulfate, ammonium persulfate, potassium persulfate, lithium hypochlorite, or sodium hypochlorite, calcium hypochlorite, sodium chlorate, sodium bromate, sodium iodate, sodium perchlorate, sodium perbromate, sodium periodate, potassium chlorate, potassium bromate, potassium iodate, potassium perchlorate, potassium perbromate, potassium periodate, ammonium chlorate, ammonium bromate, ammonium iodate, ammonium perchlorate, ammonium perbromate, ammonium periodate, magnesium chlorate, magnesium bromate, magnesium iodate, magnesium perchlorate, magnesium perbromate, magnesium periodate, zinc chlorate, zinc bromate, zinc iodate, zinc perchlorate, zinc perbromate, zinc periodate, sodium perborate, t-butyl hydroperoxide, or combinations thereof. The oxidizer may be introduced into the formation by way of the wellbore. Without limitation, the multi-functional diverter particulates may be susceptible to dissolution by acids.

Accordingly, this disclosure describes systems, compositions, and methods that may use multi-functional diverter particulate particulates for diversion, fluid loss control, and/or other subterranean treatments for controlling fluid flow in subterranean formations. Without limitation, the systems, compositions, and methods may include any of the following statements:

Statement 1: A method comprising: introducing a treatment fluid into a wellbore penetrating a subterranean formation wherein the treatment fluid comprises: a base fluid; and multi-functional diverter particulates, wherein the multi-functional diverter particulates comprise a polyvinyl alcohol and a well service additive; and diverting at least a portion of the treatment fluid and/or a subsequently introduced fluid away from the zone.

Statement 2: The method of statement 1, wherein the multi-functional diverter particulates further comprise a plasticizer.

Statement 3: The method of statement 1 or 2, wherein the plasticizer comprises at least one component selected from the group consisting of glycol, polyethylene glycol, polypropylene glycol, a fatty acid ester, a lactide monomer, a glycolide monomer, a citric acid ester, epoxidized oil, adipate ester, azaleate ester, acetylated coconut oil, and any combination thereof Statement 4: The method of any preceding statement, wherein the well service additive is selected from the group consisting of a surfactant, an acid, a base, a buffer, a breaker, a demulsifier, a scale inhibitor, a biocide, a sulfide scavenger, a sludge inhibitor, a chelating agent, a defoamer, a corrosion inhibitor, a clay control agent, and any combination thereof.

Statement 5: The method of any preceding statement, wherein the polyvinyl alcohol comprises plasticized polyvinyl alcohol.

Statement 6: The method of any preceding statement, wherein the polyvinyl alcohol is present in the multi-functional diverter particulate in an amount of about 0.01% to about 90% by weight of the multi-functional diverter particulate.

Statement 7: The method of any preceding statement, wherein the multi-functional diverter particulate comprises a pellet comprising solid particles of the well service additive in a polymer matrix of the polyvinyl alcohol.

Statement 8: The method of any preceding statement, wherein the multi-functional diverter particulate comprises a plasticizer, and wherein the multi-functional diverter particulate comprises an extrusion product of a plasticized polyvinyl alcohol.

Statement 9: The method of any preceding statement, wherein the treatment fluid further comprises an additional diverting agent in addition to the multi-functional diverter particulate.

Statement 10: The method of any preceding statement, wherein the treatment fluid is injected into the wellbore at or above a fracture gradient of the subterranean formation.

Statement 11: The method of any preceding statement, wherein prior to the step of introducing, the method further comprising mixing the treatment fluid in a mixer, wherein the introducing comprising pumping the treatment fluid into the wellbore with a pump.

Statement 12: The method of any preceding statement, wherein the polyvinyl alcohol degrades to release the well service additive over a period of about one day or less.

Statement 13: The method of any preceding statement, wherein the polyvinyl alcohol degrades to release the well service additive over a period of five days or longer.

Statement 14: The method of any preceding statement, wherein multi-functional diverting particulates have a $D_v50$ particle size ranging from about 300 microns to about 10 millimeters, wherein the polyvinyl alcohol comprises a plasticized polyvinyl alcohol, wherein multi-functional diverter particulate comprises an extrusion product of the plasticized polyvinyl alcohol and the well service additive, wherein the well service additive is present in the multi-functional diverting particulates in an amount ranging from about 1% to about 50% by weight of the multi-functional diverting particulates, wherein the method further comprise allowing at least a portion of the polyvinyl alcohol to degrade to release the well service additive.

Statement 15: A treatment fluid comprising: a base fluid; and a multi-functional diverter particulate, wherein the multi-functional diverter particulates comprise a polyvinyl alcohol and a well service additive.

Statement 16: The treatment fluid of statement 15, wherein the multi-functional diverter particulates further comprise a plasticizer.

Statement 17: The treatment fluid of statement 15 or 16, wherein the well service additive is selected from the group consisting of a surfactant, a scale inhibitor, a biocide, a sulfide scavenger, a sludge inhibitor, an acid, a base, a buffer, a breaker, a demulsifier, a chelating agent, a defoamer, a corrosion inhibitor, a clay control agent, and any combination thereof.

Statement 18: The treatment fluid of any preceding statement, wherein the polyvinyl alcohol is present in the multi-functional diverter particulate in an amount of about 0.01% to about 90% by weight of the multi-functional diverter particulate.

Statement 19: The treatment fluid of any preceding statement, wherein the polyvinyl alcohol comprises a plasticized polyvinyl alcohol, wherein the multi-functional diverter particulate comprises an extrusion product of the plasticized polyvinyl alcohol and the well service additive.

Statement 20: The treatment fluid of any preceding statement, wherein the multi-functional diverter particulate comprises a pellet comprising solid particles of the well service additive in a polymer matrix of the polyvinyl alcohol.

Example methods of using the multi-functional diverter particulate particulates will now be described in more detail with reference to FIG. 1. Any of the previous examples of the multi-functional diverter particulate particulates may apply in the context of FIG. 1. FIG. 1 illustrates an example well system 100 that may be used for preparation and delivery of a treatment fluid downhole. It should be noted that while FIG. 1 generally depicts a land-based operation, those skilled in the art will readily recognize that the principles described herein are equally applicable to subsea operations that employ floating or sea-based platforms and rigs, without departing from the scope of the disclosure.

Referring now to FIG. 1, a fluid handling system 102 is illustrated. The fluid handling system 102 may be used for preparation of a treatment fluid including the multi-functional diverter particulate and for introduction of the treatment fluid into a wellbore 104. The fluid handling system 102 may include mobile vehicles, immobile installations, skids, hoses, tubes, fluid tanks or reservoirs, pumps, valves, and/or other suitable structures and equipment. As illustrated, the fluid handling system 102 may include a fluid supply vessel 106, pumping equipment 108, and wellbore supply conduit 110. While not illustrated, the fluid supply vessel 106 may contain one or more components of the treatment fluid (e.g., multi-functional diverter particulate particulates, base fluid, etc.) in separate tanks or other containers that may be mixed at any desired time. Pumping equipment 108 may be fluidically coupled with the fluid supply vessel 106 and wellbore supply conduit 110 to communicate the treatment fluid into wellbore 104. Fluid handling system 102 may also include surface and downhole sensors (not shown) to measure pressure, rate, temperature and/or other parameters of treatment. Fluid handling system 102 may also include pump controls and/or other types of controls for starting, stopping, and/or otherwise controlling pumping as well as controls for selecting and/or otherwise controlling fluids pumped during the injection treatment. An injection control system may communicate with such equipment to monitor and control the injection of the treatment fluid. As depicted in FIG. 1, the fluid supply vessel 106 and pumping equipment 108 may be above the surface 112 while the wellbore 104 is below the surface 112. As will be appreciated by those of ordinary skill in the art, well system 100 may be configured as shown in FIG. 1 or in a different manner, and may include additional or different features as appropriate. By way of example, fluid handling system 102 may be deployed via skid equipment, marine vessel, or may be included of sub-sea deployed equipment.

Without continued reference to FIG. 1, well system 100 may be used for introduction of a treatment fluid into wellbore 104. The treatment fluid may contain a base fluid (which may be oil- or aqueous-based) and multi-functional diverter particulate, described herein. Generally, wellbore 104 may include horizontal, vertical, slanted, curved, and other types of well bore geometries and orientations. Without limitation, the treatment fluid may be applied through the wellbore 104 to subterranean formation 114 surrounding any portion of wellbore 104. As illustrated, the wellbore 104 may include a casing 116 that may be cemented (or otherwise secured) to wellbore wall by cement sheath 118. Perforations 120 allow the treatment fluid and/or other materials to flow into and out of the subterranean formation 114. A plug 122, which may be any type of plug (e.g., bridge plug, etc.) may be disposed in wellbore 104 below the perforations 120 if desired. While FIG. 1 illustrates use of treatment fluid in a cased section of wellbore 104, it should be understood that treatment fluid may also be used in portions of wellbore 104 that are not cased.

The treatment fluid including the multi-functional diverter particulate may be pumped from fluid handling system 102 down the interior of casing 116 in wellbore 104. As illustrated, well conduit 124 (e.g., coiled tubing, drill pipe, etc.) may be disposed in casing 116 through which the treatment fluid may be pumped. The well conduit 124 may be the same or different than the wellbore supply conduit 110. For example, the well conduit 124 may be an extension of the wellbore supply conduit 110 into the wellbore 104 or may be tubing or other conduit that is coupled to the wellbore supply conduit 110. The treatment fluid may be allowed to flow down the interior of well conduit 124, exit the well conduit 124, and finally enter subterranean formation 114 surrounding wellbore 104 by way of perforations 120 through the casing 116 (if the wellbore is cased as in FIG. 1) and cement sheath 118. Without limitation, the treatment fluid may be introduced into subterranean formation 114 whereby one or more fractures (not shown) may be created or enhanced in subterranean formation 114. For example, the treatment fluid may be introduced into subterranean formation 114 at or above a fracturing pressure. As previously, described, the treatment fluid including the multi-functional diverter particulate particulates may be placed into the subterranean formation 114 after a previous treatment has been performed such that additional locations in the subterranean formation 114 may be treated. Without limitation, at least a portion of the multi-functional diverter particulate may be deposited in the subterranean formation 114. As previously described, the multi-functional diverter particulate may form a barrier to fluid flow in the subterranean formation.

As previously described, a variety of treatments may be performed using the multi-functional diverter particulate. Suitable subterranean treatments may include, but are not limited to, drilling operations, production stimulation operations (e.g., fracturing, acidizing,), and well completion operations (e.g., gravel packing or cementing). These treatments may generally be applied to the subterranean formation. The barrier to fluid flow formed in the subterranean formation 114 by the multi-functional diverter particulate may be used in these treatments for diversion and fluid loss control, among others. For example, the diversion of the treatment fluids may help ensure that the treatment fluids are more uniformly distributed in the subterranean formation.

Figure 2A:
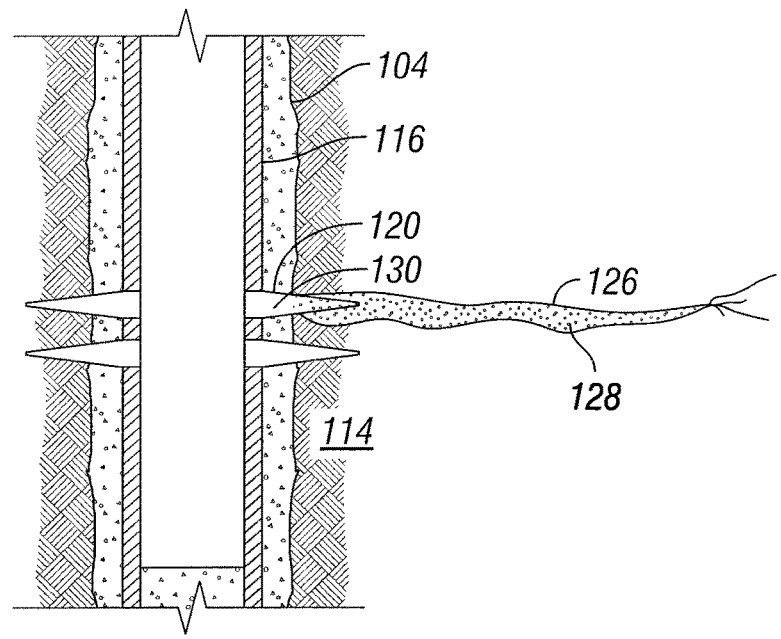
FIGS. 2A and 2B are schematic illustrations showing use of multi-functional diverter particulates in an example fracturing treatment.

The well treatment may include a fracturing treatment in which one or more fractures may be created in subterranean formation 114. Referring now to FIG. 2A, fracture 126 is shown extending from wellbore 104. The fracturing of the subterranean formation 114 may be accomplished using any suitable technique. By way of example, a fracturing treatment may include introducing a fracturing fluid into subterranean formation 114 at or above a fracturing pressure. The fracturing fluid may be introduced by pumping the fracturing fluid through casing 116, perforations 120, and into subterranean formation 114 surrounding wellbore 104. Alternatively, a jetting tool (not shown) may be used to initiate the fracture 126. The fracturing fluid may include proppant particulates which may be deposited on the fracture 126 to form a proppant pack 128.

Figure 2B:
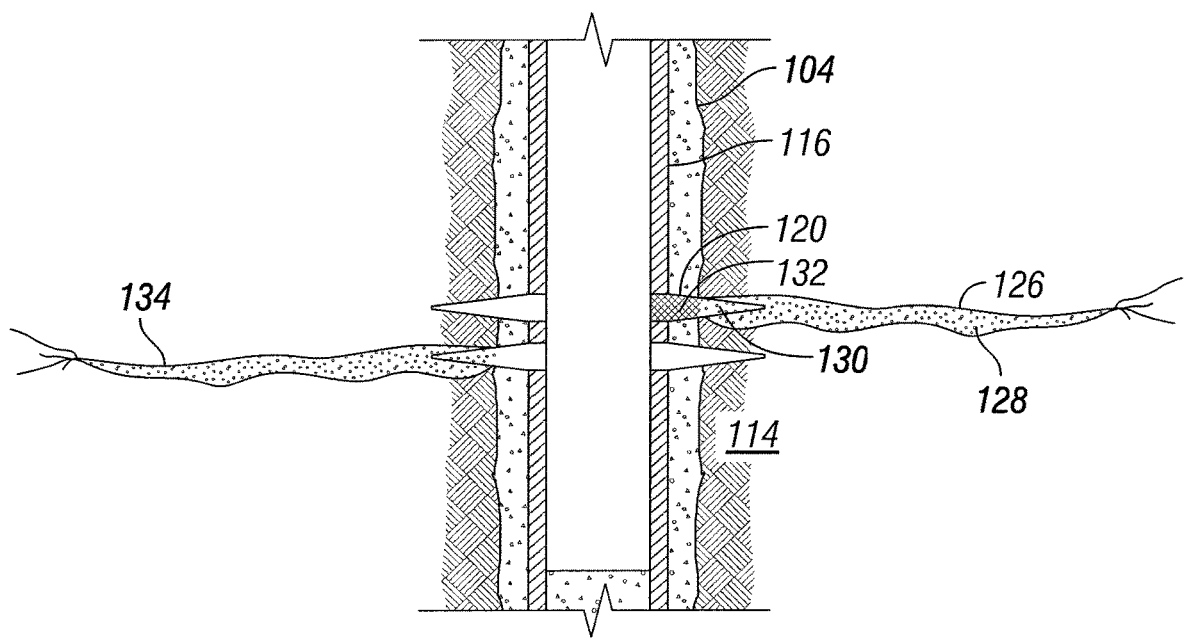

To form a barrier that can divert the fracturing fluid to additional flow paths, the multi-functional diverter particulate may be introduced into the subterranean formation 114. The multi-functional diverter particulate may be carried into the subterranean formation 114 in a treatment fluid. The multi-functional diverter particulate may be introduced through the perforation 120 and into a perforation tunnel 130. Without limitation, the treatment fluid including the multi-functional diverter particulate may be a slug of the fracturing fluid including the multi-functional diverter particulate or a separate treatment fluid including the multi-functional diverter particulate. The treatment fluid including the multi-functional diverter particulate may be introduced above the fracturing pressure or at matrix flow rates. Without limitation, the proppant pack 128 may act as a filter screening the multi-functional diverter particulate out of the treatment fluid. As a result, a layer or pack of the multi-functional diverter particulate may form on the proppant particulates, in the perforation tunnel 130, or both. As shown in FIG. 2B, a barrier 132 including the multi-functional diverter particulate may be formed in the perforation tunnel 130. The resulting barrier 132 may be able to divert fluids away from fracture 126. Such diversion may result in a back pressure build up that may be detected at surface 112 (e.g., shown on FIG. 1). After formation of the barrier 132, additional subterranean treatments may be performed. As shown on FIG. 2B, additional fracture 334 may be created in subterranean formation 114. Additional fracture 334 may be formed, for example, in a portion of subterranean formation 114 with least resistance to fluid flow, as barrier 132 has diverted the fracturing fluid into additional portions of the subterranean formation 114 in which treatment may be desired.

The exemplary multi-functional diverter particulate particulates disclosed herein may directly or indirectly affect one or more components or pieces of equipment associated with the preparation, delivery, recapture, recycling, reuse, and/or disposal of the multi-functional diverter particulate particulates. For example, the multi-functional diverter particulate particulates may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the sealant composition. The multi-functional diverter particulate particulates may also directly or indirectly affect any transport or delivery equipment used to convey the multi-functional diverter particulate particulates to a well site or downhole such as, for example, any transport vessels, conduits, pipelines, trucks, tubulars, and/or pipes used to compositionally move the multi-functional diverter particulate particulates from one location to another, any pumps, compressors, or motors (e.g., topside or downhole) used to drive the multi-functional diverter particulate particulates into motion, any valves or related joints used to regulate the pressure or flow rate of the multi-functional diverter particulate particulates (or fluids containing the same multi-functional diverter particulate particulates), and any sensors (i.e., pressure and temperature), gauges, and/or combinations thereof, and the like. The disclosed multi-functional diverter particulate particulates may also directly or indirectly affect the various downhole equipment and tools that may come into contact with the multi-functional diverter particulate particulates such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present disclosure, the following examples of certain aspects of some of the systems and methods are given. In no way should the following examples be read to limit, or define, the entire scope of the disclosure.

EXAMPLE 1

Tests were run to determine the leaching effects of PVA impregnated with a well service additive. In this example, the the well service additive was an organic acid. Beads of PVA with entrapped organic acid were prepared by cross-linking a slurry of PVA and the organic acid with boric acid. The beads of PVA and organic acid were then added to 50 milliliters of deionized water (pH approximately 7.0) and the resultant pH change as a function of time was recorded and provided in the table below.

TABLE 1

| Sample | Time | pH |
| --- | --- | --- |
| Organic Acid (control) | 10 minutes | 2.8 |
| PVA Beads with Organic Acid | 30 minutes | 6.5 |
| PVA Beads with Organic Acid | 1 hour | 6.0 |
| PVA Beads with Organic Acid | 24 hours | 2.5 |

Comparing the bead of PVA and the organic acid with a control of organic acid, illustrate slow release of the organic acid from PVA dissolution in the water, which is recognized by the change in pH of the fluid. When pure organic acid is added to the water, the pH lowered to 2.8 in 10 minutes, whereas the beads of PVA and organic acid (with more than double the amount of organic acid, 0.13 grams) achieved a similar pH of 2.5 in 24 hours.

It should be understood that the compositions and methods are described in terms of "including," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method comprising:
   introducing a treatment fluid into a wellbore penetrating a subterranean formation, wherein the treatment fluid comprises:
   a base fluid; and
   multi-functional diverter particulates, wherein the multi-functional diverter particulates comprise a polyvinyl alcohol, a plasticizer, and at least one well service additive selected from the group consisting of a surfactant, a buffer, a demulsifier, a scale inhibitor, a biocide, a sulfide scavenger, a sludge inhibitor, a chelating agent, a defoamer, a corrosion inhibitor, a clay control agent, and any combination thereof; and
   diverting at least a portion of the treatment fluid and/or a subsequently introduced fluid away from a zone in the subterranean formation.

2. The method of claim 1, wherein the plasticizer comprises at least one component selected from the group consisting of a glycol, polyethylene glycol, polypropylene glycol, a fatty acid ester, a lactide monomer, a glycolide monomer, a citric acid ester, epoxidized oil, adipate ester, azaleate ester, acetylated coconut oil, and any combination thereof.

3. The method of claim 1, wherein the polyvinyl alcohol comprises a plasticized polyvinyl alcohol, wherein the plasticized polyvinyl alcohol comprises the polyvinyl alcohol and the plasticizer.

4. The method of claim 1, wherein the polyvinyl alcohol is present in the multi-functional diverter particulate in an amount of about 0.01% to about 90% by weight of the multi-functional diverter particulate.

5. The method of claim 1, wherein the multi-functional diverter particulate comprises a pellet comprising solid particles of the well service additive in a polymer matrix of the polyvinyl alcohol.

6. The method of claim 1 wherein the multi-functional diverter particulate comprises an extrusion product of a plasticized polyvinyl alcohol, wherein the plasticized polyvinyl alcohol comprises the polyvinyl alcohol and the plasticizer.

7. The method of claim 1, wherein the treatment fluid further comprises an additional diverting agent in addition to the multi-functional diverter particulate.

8. The method of claim 1, wherein the treatment fluid is injected into the wellbore at or above a fracture gradient of the subterranean formation.

9. The method of claim 1, wherein prior to the step of introducing, the method further comprising mixing the treatment fluid in a mixer, wherein the introducing comprising pumping the treatment fluid into the wellbore with a pump.

10. The method of claim 1, wherein the polyvinyl alcohol degrades to release the well service additive over a period of about one day or less.

11. The method of claim 1, wherein the polyvinyl alcohol degrades to release the well service additive over a period of five days or longer.

12. The method of claim 1, wherein multi-functional diverting particulates have a Dv50 particle size ranging from about 300 microns to about 10 millimeters, wherein the polyvinyl alcohol comprises a plasticized polyvinyl alcohol, wherein the plasticized polyvinyl alcohol comprises the polyvinyl alcohol and the plasticizer, wherein multi-functional diverter particulate comprises an extrusion product of the plasticized polyvinyl alcohol and the well service additive, wherein the well service additive is present in the multi-functional diverting particulates in an amount ranging from about 1% to about 50% by weight of the multi-functional diverting particulates, wherein the method further comprises allowing at least a portion of the polyvinyl alcohol to degrade to release the well service additive.

13. The method of claim 1, wherein the well service additive is present in an amount of about 0.001% to about 70% by weight of the multi-functional diverter particulate.

14. The method of claim 1, wherein the multi-functional diverter particulate further comprises a dissolution accelerator.

15. The method of claim 14, wherein the dissolution accelerator comprises at least one component selected from the group consisting of inorganic acids, solid organic acids, simple saccharides, metal salts, and any combination thereof.

16. A method comprising:
   introducing a treatment fluid into a wellbore penetrating a subterranean formation, wherein the treatment fluid comprises:
   a base fluid; and
   multi-functional diverter particulates, wherein the multi-functional diverter particulates comprise a polyvinyl alcohol, at least one well service additive, and a plasticizer, wherein the polyvinyl alcohol is present in the multi-functional diverter particulate in an amount of about 0.01% to about 90% by weight of the multi-functional diverter particulate, and wherein the well service additive is selected from the group consisting of a surfactant, a buffer, a demulsifier, a scale inhibitor, a biocide, a sulfide scavenger, a sludge inhibitor, a chelating agent, a defoamer, a corrosion inhibitor, a clay control agent, and any combination thereof; and
   diverting at least a portion of the treatment fluid and/or a subsequently introduced fluid away from a zone in the subterranean formation.

17. The method of claim 16, wherein the plasticizer comprises at least one component selected from the group consisting of a glycol, polyethylene glycol, polypropylene glycol, a fatty acid ester, a lactide monomer, a glycolide monomer, a citric acid ester, epoxidized oil, adipate ester, azaleate ester, acetylated coconut oil, and any combination thereof.

18. The method of claim 16, wherein the multi-functional diverter particulate comprises a pellet comprising solid particles of the well service additive in a polymer matrix of the polyvinyl alcohol.

19. The method of claim 16, wherein the multi-functional diverter particulate further comprises a dissolution accelerator.

* * * * *